June 12, 1962     H. PAPST     3,038,678
MAGNETIC TAPE APPARATUS

Filed Nov. 17, 1959     2 Sheets-Sheet 1

Inventor:
Hermann Papst
By Michael S. Striker
Attorney

June 12, 1962 H. PAPST 3,038,678
MAGNETIC TAPE APPARATUS
Filed Nov. 17, 1959 2 Sheets-Sheet 2
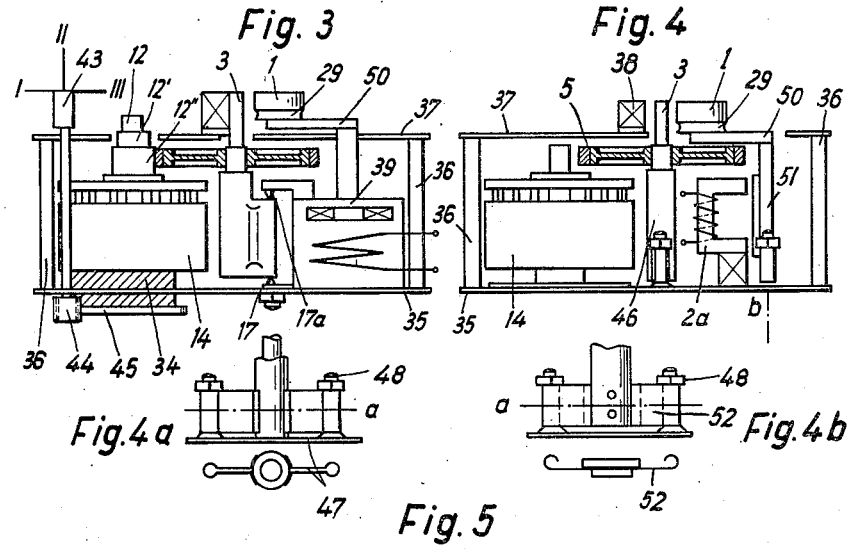
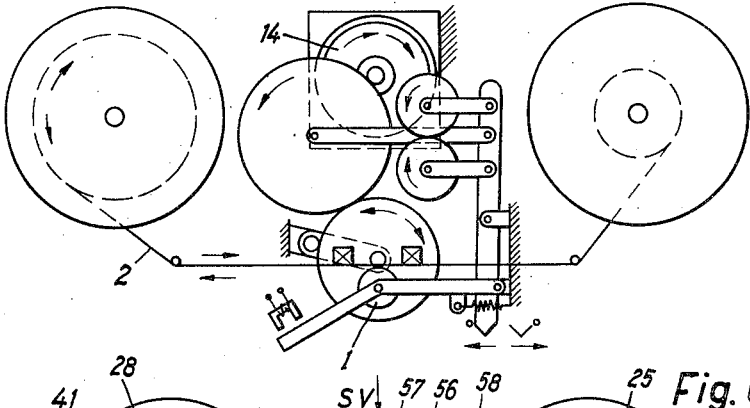
Inventor:
Hermann Papst
By Michael S. Striker
Attorney

United States Patent Office 3,038,678
Patented June 12, 1962

3,038,678
MAGNETIC TAPE APPARATUS
Hermann Papst, St. Georgen, Black Forest, Germany
Filed Nov. 17, 1959, Ser. No. 853,508
Claims priority, application Germany Nov. 17, 1958
10 Claims. (Cl. 242—55.12)

The invention relates to a drive mechanism for magnetic tape apparatus and especially to such drive mechanism in which friction wheels are interposed between the driving motor and the roller which advances the tape.

In order to avoid disturbing noise when in operation such friction drives are equipped with friction wheels having soft, elastic margins. In friction drives of this kind it is found disadvantageous that friction wheels pressed against one another with an appropriate pressure when left stationary for long periods tend to become deformed owing to the effect of the prolonged pressure at a single part of the circumference. This produces persistent deformations of the soft, elastic wheel rims which is particularly serious in the case of the friction wheel which cooperates with the motor shaft, since this becomes heated when in operation. The resultant deformation of the friction wheels gives rise to rumble and disturbance of the uniformity of the movement of the tape which in turn results in a distortion of the recorded or reproduced signals.

It is an object of the invention to provide means for overcoming the aforesaid difficulties. More specifically it is an object of the invention to release the pressure between the friction wheels of the drive mechanism when the tape is stationary.

One of the principal objects of the invention consists in supporting at least one friction wheel hingedly in such a way that the pressure between the friction wheels is immediately automatically released when the advancing tape is stopped. This arrangement offers the remarkable advantage that the wheels are no longer deformed by the persistent pressure between them when stationary and depressions are avoided in the elastic margins of the wheels when not in operation.

It is another object of the invention to change the speed of the magnetic tape by shifting the driving motor parallel and perpendicular to its axis.

According to a special feature of the invention the driving motor is mounted in a multi-start screw of large diameter.

It is a still further object of the invention to derive the motion for the take-up spool from a roll which is engaged with a friction wheel only when the magnetic tape is being transported.

This special feature of driving mechanism for the take-up spool offers the advantage that without additional means the movement of the tape is stopped more quickly than in driving mechanism of the conventional kind. Furthermore when the tape transport is stopped and the driving motor running idly the apparatus will produce less noise and run more smoothly than in similar apparatus of the conventional type.

The invention consists in novel features and combinations hereinafter described and particularly pointed out in the appended claims.

Further objects and advantages of the invention which are directed to especial useful arrangements of the components of the friction drive will be more fully understood from the following description taken in connection with the accompanying drawings of embodiments of the invention.

The figures show diagrammatically the drive mechanism and some of its details. All parts not being necessary for understanding the invention have been omitted for sake of simplicity and for giving a better view of the main parts. In the drawings corresponding elements are denoted in several figures by the same reference numerals.

FIGURE 3 is a schematic side elevation of the magnetic tape apparatus described in relation to FIGURE 2.

FIGURE 4 is a schematic side elevation of another embodiment of magnetic tape apparatus according to the invention.

FIGURES 4a and 4b are elevations of details of the apparatus shown in FIGURE 4.

FIGURE 5 is a schematic plan view of an embodiment of magnetic tape apparatus embodying the principle described in relation to FIGURE 1 and FIGURE 6 is a schematic plan view of another embodiment of magnetic tape apparatus embodying the principle described in relation to FIGURE 2.

Figure 1:
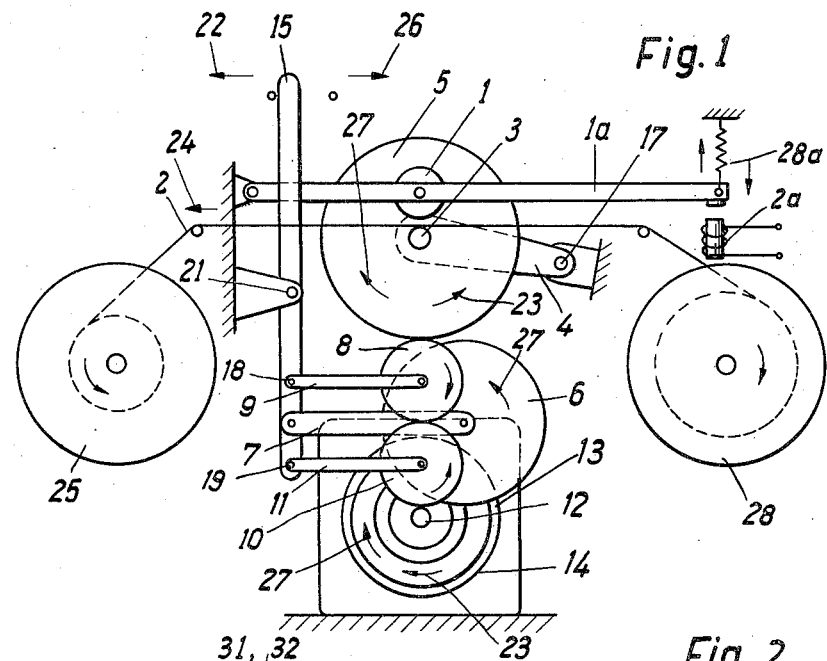
FIGURE 1 is a schematic view of a reversing tape drive mechanism according to one embodiment of the invention.

In the embodiment of the invention illustrated by FIGURE 1 a tape 2 is required to be transported from one to the other of two tape spools 25 and 28 past a transducer device (not shown) by means of which signals may be recorded upon or reproduced from the tape. For this purpose, tape 2 is pressed against a capstan roller 3, which is rotated in the appropriate direction, by means of a pressure roll 1 carried on a lever 1a. When the tape 2 is to be set in motion current is passed through the winding of an electromagnet 2a which then attracts an armature carried on the end of lever 1a. The end of lever 1a is thus drawn towards the magnet and the pressure roll 1 which it carries presses the tape 2 against the capstan roller 3. Capstan roller 3 is carried on an arm 4 which is hinged at 17 to a bracket on a supporting member. On the shaft of capstan roller 3 is fixed a friction wheel 5, which in turn is pressed against the first of a pair of friction wheels 8, 10. These wheels are carried respectively on arms 9 and 11 which are hined at 18 and 19 respectively to a rocking lever 15, the purpose of which is described below. Friction wheel 10 in turn engages a shaft 12 which is carried in a bearing in the end-plate 13 of a drive motor 14, and if this motor is in motion the tape will be transported.

When, as shown in the drawing, the top end of rocking lever 15 is moved to the left, as indicated by arrow 22, until it strikes its left-hand stop, the pair of friction wheels 8, 10 is engaged between motor shaft 12 and friction wheel 5 as the latter is depressed by the action of pressure roll 1 on capstan roller 3. If motor 14 rotates in the clockwise direction, then the drive to friction wheel 5 through friction wheels 8, 10 causes wheel 5 to rotate in the anticlockwise direction as indicated by arrows 23 and the tape is then transported to the left as indicated by arrow 24.

If, on the other hand, the top end of rocking lever 15 is moved to the right as indicated by arrow 26 until it engages its right-hand stop, then a single, larger friction wheel 6, which is pivoted upon an arm 7 hinged to lever 15 at 20, is engaged between shaft 12 and friction disc 5 and this then rotates in the clockwise direction, as indicated by arrow 27 so that the tape is then transported to the right.

When the drive is engaged for either direction, then that spool 25 or 28 which then becomes the take-up spool is arranged by conventional means (not shown) to be driven at a speed appropriate to the tape velocity.

To stop the tape feed the flow of current through the winding of magnet 2a is interrupted. Lever 1a is then raised by the tension spring 28a, so that pressure roll 1 ceases to bear upon tape 2 and this in turn no longer presses on capstan roller 3. The pressure between the friction wheels of the driving chain is therefore released and flat spots will not be formed when the drive mechanism becomes stationary.

Figure 2:
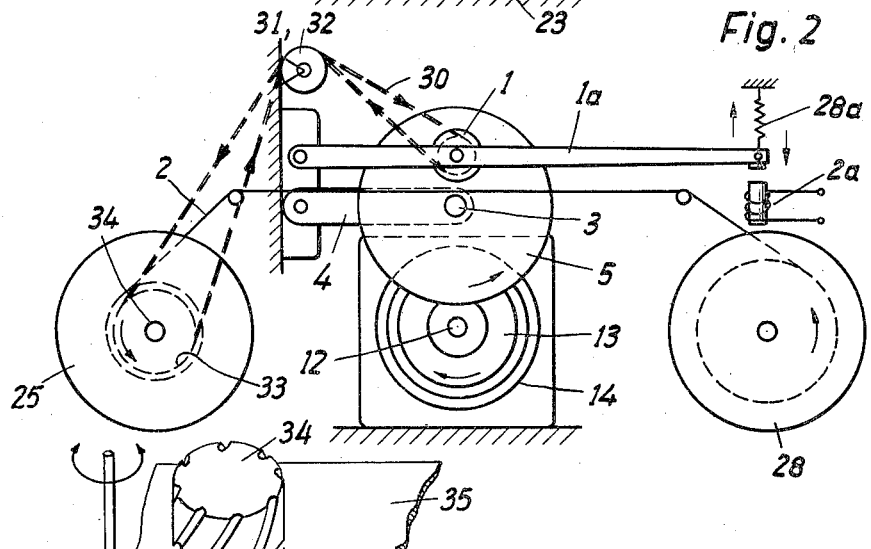
FIGURE 2 is a schematic diagram illustrating another embodiment of magnetic tape apparatus incorporating the present invention and arranged for irreversible tape transport.

FIGURE 2 shows the principle of an alternative embodiment of the invention in which provision is made for movement of the tape in one direction only, from the right-hand spool on to the left-hand spool 25. In this case when pressure roll 1 lowered by lever 1a upon tape 2 and this latter bears upon capstan roller 3, the friction wheel 5 carried on the shaft of the capstan roller engages the shaft 12 of motor 24 directly.

On the shaft of pressure roll 1 is mounted a pulley which, when roll 1 is moved by the movement of the tape, drives a belt 30. This belt passes over guide pulleys 31, 32 and around a further pulley 33 carried on the shaft 34 of the take-up spool 25, which is thus driven at an appropriate speed. At some point in this drive provision must be made for slip to occur as the reel of tape grows in size. Any suitable conventional means may be employed.

An advantage of this arrangement is that the take-up drive to the spool is disconnected when the pressure roll is lifted from the tape to stop the tape movement. This automatic connection of the take-up drive with the tape transport drive is essential to produce accurate movement of the tape during the desired periods and to prevent any snatching of the tape at the commencement or cessation of transport.

Figure 3A:
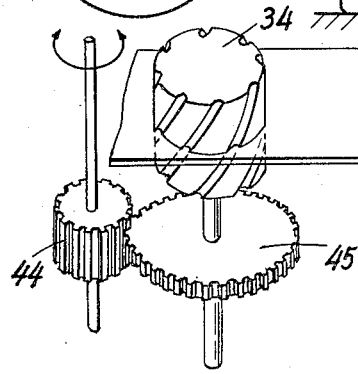
FIG. 3a is a partial perspective view showing a detail of the apparatus illustrated in FIG. 3 at an enlarged scale.

FIGURE 3 shows how a practical embodiment of the invention according to the principle of FIGURE 2 may be carried out. In this arrangement the pressure roll is moved parallel to its axis, so that the axes of the pressure roll 1, the capstan roller 3 and the motor 14 remain at all times parallel to one another. The drive unit illustrated is carried in a framework consisting of a baseplate 35 to which a top plate 37 is secured by pillars 36. The drive motor 14 is carried on the baseplate by means of a threaded member 34 fastened to the stator of motor 14 and working with a multiple screw thread in baseplate 35 as best shown in FIG. 3a. When member 34 is turned, motor 14 is raised or lowered, so that any one of the sections of the stepped driving shaft 12, 12', 12" may engage with friction wheel 5. The threaded member 34 is of large diameter in order to avoid tilting of the motor and is made free from play. Means may also be provided which prevent the appearance of play due to resilient snatch.

The threaded mounting member 34 is secured somewhat eccentrically to the base of motor 14, so that as the motor is raised the circumferences of the different steps on the driving roller 12 lie at approximately the same distance from the centre of friction wheel 5. The handle 43 controls the height adjustment for the driving motor. On rotating the handle the pinion 44 on the lower end of the handle shaft rotates with it and drives the ring-gear 45 which is secured to the threaded mounting member 34 of the driving motor 14.

The capstan roller 3 is arranged for movement of its axis parallel to itself by mounting it on an arm which is hinged to the supporting framework by means of the pivots 17, 17a, which may be pivot points or balls engaging in small angular holes. The upper pivot 17a is secured, for convenience in construction only, to the casing of a rotary magnet 39 which controls the movement of the pressure roll 1. The lower pivot 17 is formed by a screw working in a nut secured to the baseplate 35. Appropriate means are preferably provided whereby the upper pivot 17a may be adjusted in position with respect to the housing of the rotary magnet so as to ensure that the axes of the capstan roller and of the rotary magnet are parallel.

The pressure roll 1 is carried on a crank arm 50 secured to the shaft of the rotary magnet 39. Below the pressure roll is arranged a grooved pulley 29. As may be seen from FIGURE 2, a belt 30 runs over pulley 29 and over a pulley 33 on the shaft of the take-up spool to provide the take-up drive. The twin pulleys 31 and 32 allow the belt 30 to cross without rubbing.

FIGURE 4 shows the side elevation of an embodiment of magnetic tape apparatus according to the invention in which the capstan roller 3 with its friction wheel 5 may be hinged about a transverse axis a near the baseplate (see also FIGURE 4a). The pressure roll 1 is likewise carried on a lever 50 hinged about a transverse axis b (see also FIGURE 4b). When the laterally exerted force of electromagnet 2a is exerted on an armature 51 carried on lever 50, then roll 1 engages with capstan roller 3 and friction wheel 5 is caused to press against motor shaft 12, the arrangement being such that under these conditions all the axes are parallel to each other. The external-rotor driving motor 14 and the pivots for the driving shaft and pressure roll are secured to the baseplate 35, which is connected by pillars 36 to a top plate 37, which carries the sound head 38. Alternatively, as in FIGURE 3, the pressure roll 1 may be arranged for movement parallel to itself, for example, on the arm of a rotary magnet.

In FIGURE 4a are shown the side elevation and a plan view of the pivotal connection between the lower part of the capstan shaft bearing tube and the baseplate of the apparatus shown in FIGURE 4. To each side of bearing tube 46 is soldered an arm 47 of thin sheet metal which is so formed as to provide an eye at the end of the arm more remote from tube 46. Through each eye passes a screw 48 by which it is secured to the baseplate, so that the driving shaft bearing tube 46 is firmly held against axial movement. Pressure in the direction perpendicular to the thin, sheet-metal arms 47, however, will produce a small rotation of the bearing tube 46 about the axis a which allows the driving shaft to be hinged to the necessary extent. In the rest condition the spring effect of the sheet-metal arms 47 lifts the friction wheel 5 from the motor shaft 12.

FIGURE 4b shows a side elevation and a plan view of a similar arrangement by which the arm 50, carrying the pressure roll 1 and the armature 51 of the magnet 2a, is hinged to the baseplate. The arrangement is similar to that used for the driving shaft, the spring 52 which is riveted to the lower end of arm 50 being looped at its ends to form eyes which are secured to the baseplate by screws 48. In its own plane spring 52 is very stiff, but to forces perpendicular to this plane it yields with relative ease. Appropriate movement of the pressure roll 1 under the influence of magnet 2a is therefore possible without the magnet being required to exert any very great force on its armature. When magnet 2a is not excited, spring 52 holds pressure roll 1 at a sufficient distance from capstan roller 3 to allow the tape to be changed.

The position of the tape in the direction parallel to the axis of the capstan roller is controlled by guide-posts 54 (see FIGURE 6) which are provided with grooves of appropriate width in which the tape runs, so that its position is accurately maintained. The position of the capstan must therefore be aligned to agree with that of the tape.

In the pivoted arrangement shown in FIGURES 4a and 4b this alignment is very easily carried out. For this purpose washers of different thicknesses may be placed on the threaded pillars 48 beneath the spring arms 47 and 52, or resilient washers, for example of rubber, may be used. In the latter case the alignment of the axis of the driving shaft to parallelism with that of the pressure roll may also be effected by tightening the screws 48 to different amounts.

FIGURE 5 shows a drive for a sound-tape apparatus, of which the mode of operation is similar to that described in relation to FIGURE 1. While FIGURE 1 was a purely schematic illustration of the various components to show the principle of operation, FIGURE 5 shows more closely the actual form of the various elements of the sound-tape apparatus. Both the sound and the erase heads 38 are therefore shown.

The magnetic tape apparatus illustrated by FIGURE 6 agrees in principle with that shown in FIGURE 2; it is however made up of somewhat different units. In this case also the illustration shows elements corresponding more closely to the actual forms of the practical apparatus.

Rapid rewind of the tape 2 on to the feed spool 28 may be effected by means of an intermediate friction wheel 40. For this purpose friction wheel 40 and the bearing of the feed spool 28 are carried on hinged arms. If the hinged arm 41 which carries the feed spool is urged in the direction of the arrow R against the friction wheel 40, then this in turn is brought into contact with the external rotor of the driving motor 14, or alternatively with a friction wheel carried on its shaft.

The friction wheel 5 carried on the capstan shaft preferably consists of a friction layer secured to the periphery of a light disc. The flywheel effect is thus concentrated in the motor 14; in practical applications the kinetic energy of the motor ($mv.^2/2$) may amount to 100 to 500 times that of the friction wheel.

In order in case of need to be able to obtain a rapid forward movement of the sound tape, a roller 57 mounted on a hinged arm 56 is moved in the direction shown by arrow SV above the roller; the belt 58 is thus brought into contact with the rotor of the driving motor and the spool 25 is thus driven with relatively high speed. Naturally this must take place only when the pressure roll is not pressed against the tape; when it is so pressed the hinged arm 56 should be locked.

I claim:

1. In an arrangement for transporting a magnetic tape, in combination, a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof; a common shaft fixedly carrying said capstan roller and said friction wheel for simultaneous rotation; drive means including a rotatable member adapted to frictionally engage said friction wheel for driving the latter; means mounting said shaft turnable about its axis and movable parallel to itself toward said rotatable member so that said friction wheel frictionally engages said rotatable member so as to be driven thereby and away from said rotatable member so as to prevent prolonged pressure to a portion of said friction wheel; and means for pressing said capstan roller against said tape and thereby moving said shaft toward said rotatable member so as to bring said friction wheel in frictional engagement with said rotatable member.

2. In an arrangement for transporting a magnetic tape, in combination, a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof; a common shaft fixedly carrying said capstan roller and said friction wheel for simultaneous rotation; drive means including a rotatable member adapted to frictionally engage said friction wheel for driving the latter; means mounting said shaft turnable about its axis and tiltable about an axis substantially normal to the axis of said shaft toward said rotatable member so that said friction wheel frictionally engages said rotatable member so as to be driven thereby and away from said rotatable member so as to prevent prolonged pressure to a portion of said friction wheel; and means for pressing said capstan roller against said tape and thereby moving said shaft toward said rotatable member so as to bring said friction wheel in frictional engagement with said rotatable member.

3. In an arrangement for transporting a magnetic tape, in combination, a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof; a common shaft fixedly carrying said capstan roller and said friction wheel for simultaneous rotation; drive means including a rotatable member adapted to frictionally engage said friction wheel for driving the latter; means mounting said shaft turnable about its axis and tiltable about an axis substantially normal to the axis of said shaft toward said rotatable member so that said friction wheel frictionally engages said rotatable member and away from said rotatable member, said means including a stationary support, bearing means mounting said shaft for rotation, and a torsionally flexible sheet member arranged in a plane passing through the axis of said shaft and connecting said bearing means to said support; and means for pressing said capstan roller against said tape and thereby moving said shaft toward said rotatable member so as to bring said friction wheel in frictional engagement with said rotatable member.

4. In an arrangement for transporting a magnetic tape, in combination, a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof; a common shaft fixedly carrying said capstan roller and said friction wheel for simultaneous rotation; drive means including a rotatable member adapted to frictionally engage said friction wheel for driving the latter; means mounting said shaft turnable about its axis and tiltable about an axis substantially normal to the axis of said shaft toward said rotatable member so that said friction wheel frictionally engages said rotatable member and away from said rotatable member, said means including a stationary support, bearing means mounting said shaft for rotation, a pair of torsional flexible sheet members arranged in a plane passing through the axis of said shaft and connected at inner edge portions thereof to said bearing means and having outer edge portions each formed into a sleeve, and a pair of screw members respectively passing through said sleeves and secured to said stationary support; and means for pressing said capstan roller against said tape and thereby moving said shaft toward said rotatable member so as to bring said friction wheel in frictional engagement with said rotatable member.

5. In an arrangement for transporting magnetic tape, in combination, a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof and said friction wheel having an axis located on said one side of said tape; a common shaft fixedly carrying said capstan roller and said friction wheel for simultaneous rotation; drive means including a rotatable member adapted to frictionally engage said friction wheel for driving the latter, said rotatable member being located on said one side of said tape and spaced farther therefrom than the axis of said friction wheel; means mounting said shaft turnable about its axis and movable toward said rotatable member so that said friction wheel frictionally engages said rotatable member to be driven thereby and away from said rotatable member so as to prevent prolonged pressure to a portion of said friction wheel; pressure means located at the other side of said tape and movable toward and away from said capstan roller between an active position in which said pressure means simultaneously presses the tape against said capstan roller, and said capstan roller and said friction wheel toward said rotatable member, so that said capstan roller is rotated by said friction wheel and transports said tape and an inactive position in which said pressure means is spaced from the tape and said capstan roller relieving thereby the pressure between said friction wheel and said rotatable member; and means for moving said pressure means between said positions thereof.

6. In an arrangement for transporting magnetic tape, in combination, a support; a capstan roller adapted to frictionally engage the tape on one side thereof for transporting said tape; at least one friction wheel cooperating with said capstan roller for driving the latter, said friction wheel being subject to permament deformation under prolonged pressure to a portion thereof and said friction wheel having an axis located on said one side of said tape; a common shaft fixedly carrying said capstan roller and said friction wheel for simultaneous rotation; drive means including a rotatable member adapted to frictionally engage said friction wheel for driving the latter, said rotatable member being located on said one side of said tape and spaced farther therefrom than the axis of said friction wheel; means mounting said shaft on said support turnable about its axis and movable toward said rotatable member so that said friction wheel frictionally engages said rotatable member to be driven thereby and away from said rotatable member so as to prevent prolonged pressure to a portion of said friction wheel; pressure means including a support member mounted on said support pivotable about an axis substantially parallel to and spaced laterally from the axis of said shaft and a pressure roller located on the other side of said tape and turnably carried by said support member spaced from the pivoting axis thereof so that said pressure roller is movable toward and away from said capstan roller between an active position in which said pressure roller simultaneously presses the tape against said capstan roller, and said capstan roller and said friction wheel toward said rotatable member, so that said capstan roller is rotated by said friction wheel and transports said tape and an inactive position in which said pressure roller is spaced from the tape and said capstan roller relieving thereby the pressure between said friction wheel and said rotatable member; and means co-operating with said support member for moving said pressure roller between said positions thereof.

7. In an arrangement for transporting magnetic tape, in combination, a support; a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof; a common shaft fixedly carrying said capstan roller and said friction wheel for simultaneous rotation; drive means including a rotatable member adapted to frictionally engage said one friction wheel for driving the latter, said rotatable member being located on said one side of said tape and spaced farther therefrom than the axis of said shaft; means mounting said shaft turnable about its axis and movable toward said rotatable member so that said friction wheel frictionally engages said rotatable member to be driven thereby and away from said rotatable member so as to prevent prolonged pressure to a portion of said friction wheel; pressure means including a pressure roller turnable about its axis and movable toward and away from said capstan roller between an active position in which said pressure roller simultaneously presses the tape against said capstan roller and said friction wheel toward said rotatable member so that said capstan roller is rotated and transports said tape and an inactive position in which said pressure roller is spaced from the tape and said capstan roller relieving thereby the pressure between said friction wheel and said rotatable member; means for moving said pressure roller between said positions thereof; a take-up spool turnably mounted on said support; a drive member fixed to said pressure roller concentric therewith for simultaneous rotation with said pressure roller; and transmission means operatively connected to said drive member and said take-up spool and including slip means for rotating said take-up spool upon rotation of said drive member while permitting slip of said take-up spool with respect to said drive member.

8. In an arrangement for transporting a magnetic tape, in combination, a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof; a drive motor having a drive shaft adapted to frictionally engage said friction wheel for driving the latter, said drive shaft having at least two axially displaced portions of different diameter; means for shifting said motor and said drive shaft in axial direction for selectively aligning one of said shaft portions with said friction wheel; means mounting said capstan roller and said friction wheel turnable about the axes thereof and movable toward said drive shaft so as to be driven thereby and away from said rotatable member so as to prevent prolonged pressure to a portion of said friction wheel; and means for simultaneously pressing said capstan roller against said tape and said friction wheel in frictional engagement with said drive shaft.

9. In an arrangement for transporting a magnetic tape, in combination, a capstan roller adapted to frictionally engage the tape on one side thereof for transporting said tape; at least one friction wheel co-operating with said capstan roller for driving the latter, said friction wheel being subject to permanent deformation under prolonged pressure to a portion thereof; a drive motor having a drive shaft adapted to frictionally engage said friction wheel for driving the latter, said drive shaft having at least two axially displaced portions of different diameter; means for supporting and shifting said motor and said drive shaft in axial direction for selectively aligning one of said shaft portions with said friction wheel, said means including a stationary member formed with an opening therethrough extending in direction of the axis of said drive shaft and having an inner multiple thread surface, and a support member carrying said motor and turnably mounted in said opening and formed at the outer surface thereof with a multiple screw thread co-operating with said inner multiple screw thread of said opening so that upon turning said support member said motor and said drive shaft will be shifted in axial direction; means mounting said capstan roller and said friction wheel turnable about the axes thereof and movable toward said drive shaft so as to be driven thereby and away from said rotatable member so as to prevent prolonged pressure to a portion of said friction wheel; and means for simultaneously pressing said captan roller against said tape and said friction wheel in frictional engagement with said drive shaft.

10. An arrangement as defined in claim 9 in which said motor is eccentrically mounted on said support member.

References Cited in the file of this patent
UNITED STATES PATENTS

| | | |
|---|---|---|
| 2,611,618 | Camras | Sept. 23, 1952 |
| 2,721,650 | Cummings et al. | Oct. 25, 1955 |
| 2,788,209 | Montijo | Apr. 9, 1957 |
| 2,838,305 | Hoehn et al. | June 10, 1958 |
| 2,909,337 | Lahti et al. | Oct. 20, 1959 |
| 2,920,148 | Munroe | Jan. 5, 1960 |